(12) United States Patent
Joe et al.

(10) Patent No.: US 8,826,349 B2
(45) Date of Patent: Sep. 2, 2014

(54) MULTICAST ADAPTIVE STREAM SWITCHING FOR DELIVERY OF OVER THE TOP VIDEO CONTENT

(75) Inventors: Brian W. Joe, New York, NY (US); Dante J. Pacella, Charles Town, WV (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

(21) Appl. No.: 13/018,842

(22) Filed: Feb. 1, 2011

(65) Prior Publication Data

US 2012/0198506 A1 Aug. 2, 2012

(51) Int. Cl.
*H04N 7/173* (2011.01)
(52) U.S. Cl.
USPC .............................................. 725/97; 725/93
(58) Field of Classification Search
USPC ......... 725/97, 186, 187, 191, 193, 86, 87, 91, 725/93
See application file for complete search history.

(56) References Cited

U.S. PATENT DOCUMENTS

| | | | | |
|---|---|---|---|---|
| 8,218,657 B2 * | 7/2012 | Spilo | ............................. | 375/259 |
| 8,520,522 B1 * | 8/2013 | Goldman et al. | ............. | 370/235 |
| 2007/0291667 A1 * | 12/2007 | Huber et al. | .................. | 370/260 |
| 2009/0007199 A1 * | 1/2009 | La Joie | ........................... | 725/95 |
| 2009/0290856 A1 * | 11/2009 | McCarthy et al. | ............ | 386/124 |
| 2009/0323679 A1 * | 12/2009 | Anandakumar et al. | ...... | 370/352 |
| 2010/0011397 A1 * | 1/2010 | Baran et al. | ..................... | 725/90 |

* cited by examiner

*Primary Examiner* — Jefferey Harold
*Assistant Examiner* — Justin Sanders

(57) ABSTRACT

Multicast adaptive stream switching for delivery of video content over an IP-based packet network is provided. A network device obtains multiple synchronized multicast streams of the same video content, where each of the multiple synchronized multicast streams includes a different bit-rate encoding. The network device receives, from a user device, a request to join a multicast group for one of the multiple synchronized multicast streams and provides, to the user device, the one of the multiple synchronized multicast streams corresponding to the requested multicast group. The user device detects a congestion level associated with the current multicast stream. The network device receives, from the user device, a request to join a different multicast group for a different one of the multiple synchronized multicast streams and provides, to the user device, the different one of the multiple synchronized multicast streams corresponding to the requested different multicast group.

19 Claims, 7 Drawing Sheets

122 ⇀

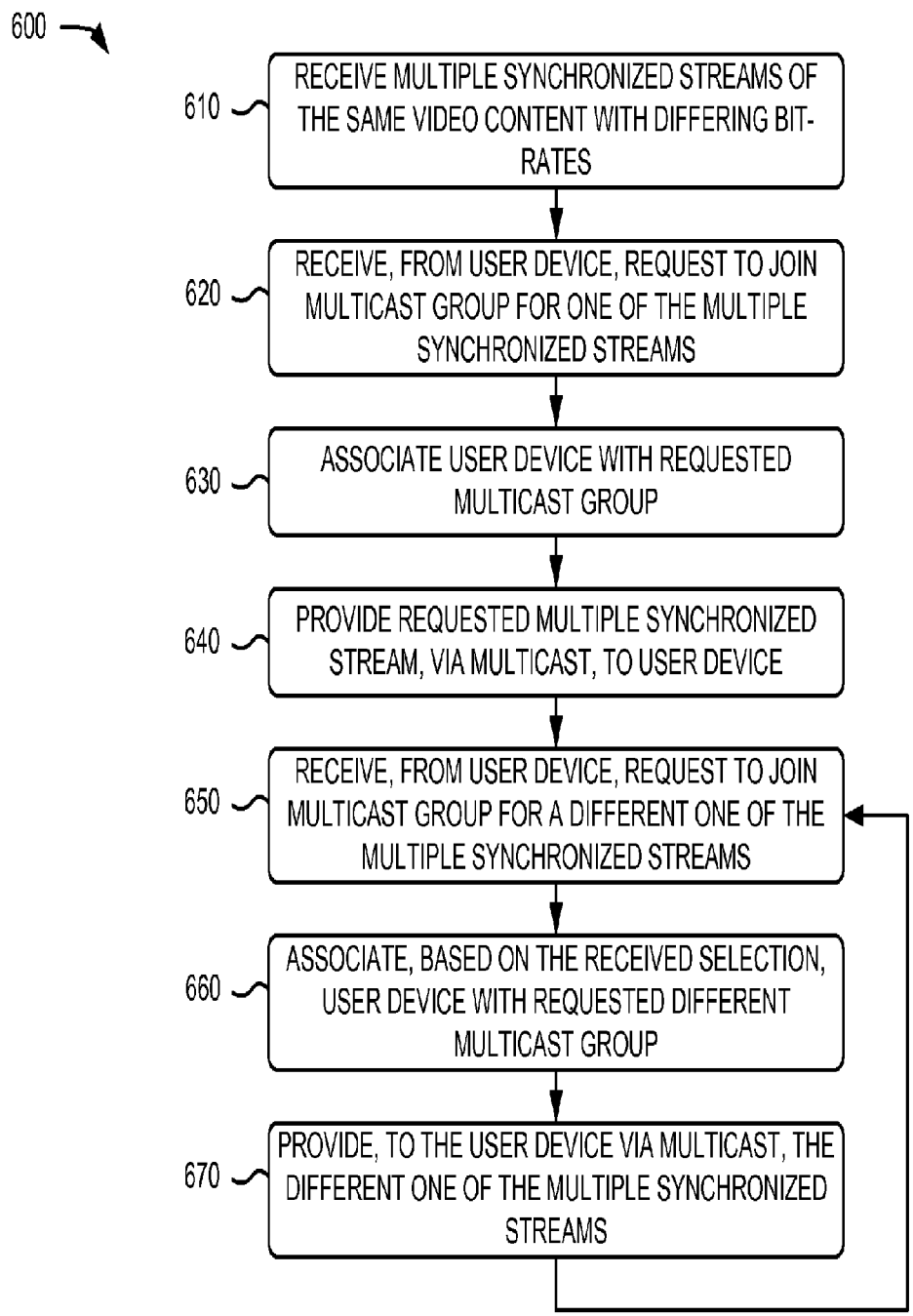

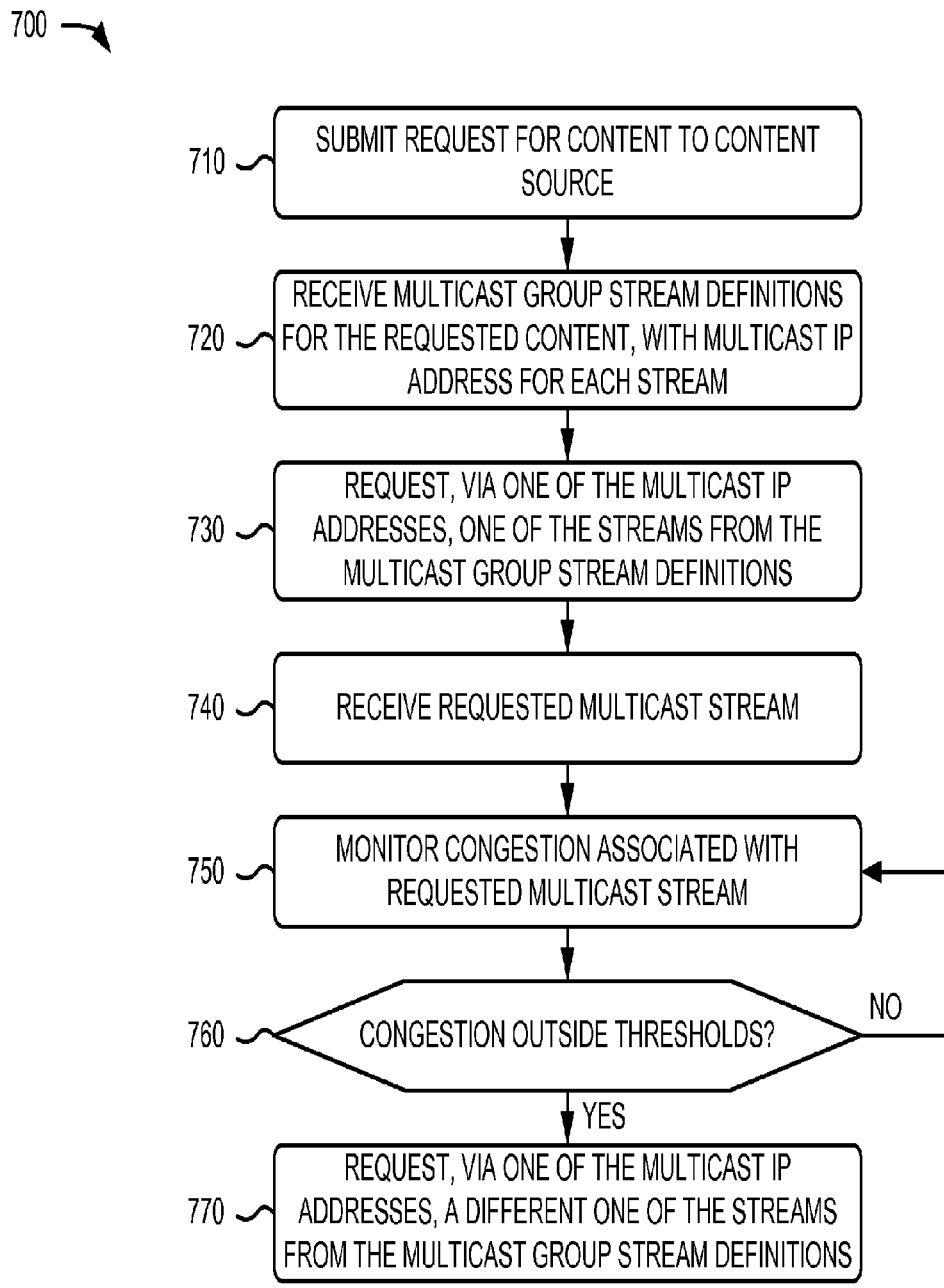

MULTICAST ADAPTIVE STREAM SWITCHING FOR DELIVERY OF OVER THE TOP VIDEO CONTENT

BACKGROUND

With today's telecommunications networks, customer devices may connect to a telecommunications provider so that the customer can receive both traditional television signals, via a dedicated connection, and Internet protocol (IP)-based data services, via an Internet connection. Video content delivered to the customer devices via an IP-based packet network may be referred to as over-the-top (OTT) delivery. OTT video content may include, for example, live content streams, pre-recorded video content (e.g., television episodes), and content associated with video portals provided by content providers, such as Hulu™, YouTube™, CNN, etc. While OTT delivery presents attractive options for customers, the Internet was not designed to deliver high-quality video broadcast at large scales. A number of techniques have been developed to enable OTT delivery of video content, but no single technique has proven able to blend ease of use with network scalability. Particularly, support of OTT during "primetime" hours, with large numbers of concurrent users, remains a challenge.

BRIEF DESCRIPTION OF THE DRAWINGS

FIG. 6 is a flowchart of an example process for providing different quality synchronized multicast streams to a user device, according to an implementation described herein; and FIG. 7 is a flowchart of an example process for performing multicast adaptive stream switching for delivery of over the top video content, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a mechanism to enable multicast adaptive stream switching for delivery of video content over an IP-based packet network. Adaptive bit-rate switching concepts may be combined with IP multicast to simultaneously stream multiple qualities (e.g., bit-rate encodings) of the same video content that can be "hot-switched" by a client application residing on a user device. Multiple bit rate encodings of video streams may be multicast to individual multicast IP addresses. These video streams may be synchronized, for example, at the content source. Each of the video streams may be a true stream, in contrast with segmented Hypertext Transfer Protocol (HTTP) packets. At the same time, the user devices may be able to detect their buffer fill rate and switch between the different quality video streams to ensure uninterrupted streaming.

In an example implementation, systems and/or methods described herein may obtain multiple synchronized multicast streams of the same video content, where each of the multiple synchronized multicast streams includes a different bit-rate encoding. The systems and/or methods may receive, from a user device, a request to join a multicast group for one of the multiple synchronized multicast streams and may provide, to the user device, the one of the multiple synchronized multicast streams corresponding to the requested multicast group. The user device may later detect a congestion level associated with the current multicast stream. The systems and/or methods may receive, from the user device, a request to join a different multicast group for a different one of the multiple synchronized multicast streams and may provide, to the user device, the different one of the multiple synchronized multicast streams corresponding to the requested different multicast group.

As used herein, the terms "subscriber," "customer,' and/or "user" may be used interchangeably. Also, the terms "subscriber," "customer," and/or "user" are intended to be broadly interpreted to include a user device (e.g., a mobile telephone, a personal computer, a set-top box, a television, etc.) or a user of a user device.

Figure 1:
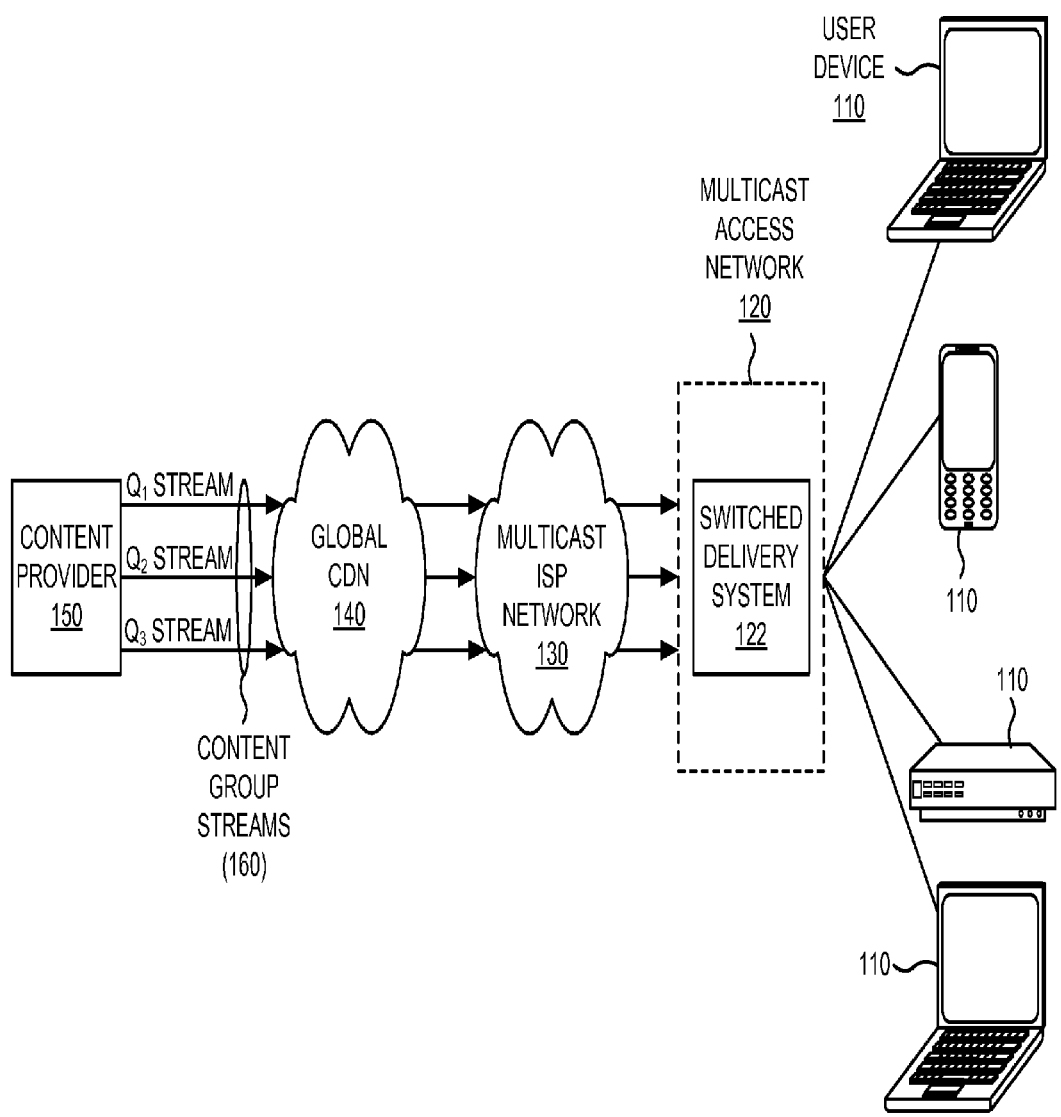
FIG. 1 is a diagram that illustrates an example network in which systems and/or methods, described herein, may be implemented.

FIG. 1 is a diagram that illustrates an example network 100 in which systems and/or methods described herein may be implemented. As shown in FIG. 1, network 100 may include user devices 110 (referred to herein collectively as "user devices 110" and generically as "user device 110"), a multicast access network 120 that includes a switched delivery system 122, a multicast Internet Service Provider (ISP) network 130, a global content delivery network (CDN) 140, and a content provider (or source) 150. Devices and/or networks of FIG. 1 may be connected via wired and/or wireless connections.

The lines shown between devices and/or networks of network 100 may represent example connections. However, components of network 100 may connect to one or more other components of network 100 even if a line showing a connection is not depicted in FIG. 1. Four user devices 110 and a single multicast access network 120, switched delivery system 122, multicast ISP network 130, global CDN 140, and content provider 150 have been illustrated in FIG. 1 for simplicity. In practice, there may be more devices and/or networks than depicted in FIG. 1.

User device 110 may include a radiotelephone, a personal communications system (PCS) terminal (e.g., that may combine a cellular radiotelephone with data processing and data communications capabilities), a set-top box (STB), a personal digital assistant (PDA) (e.g., that can include a radiotelephone, a pager, Internet/intranet access, etc.), a laptop computer, a tablet or "pad" computer, a personal computer, a smart phone, a television, or other types of computation and/or communication devices. In one implementation, user device 110 may include any device (e.g., an IP-based device) that enables a user to access the Internet and/or communicate with multicast access network 120, switched delivery system 122, multicast ISP network 130, global CDN 140, and/or content provider 150. In an example implementation, one or more user devices 110 may reside within a home network at a customer's premises (not shown).

In an example implementation, user device 110 may include a player (e.g., proprietary software or a commercial-off-the-shelf (COTS) multimedia player) that plays streaming content (e.g., content that continuously plays early in a download process without requiring a complete download in order to play the content). The player may be imbedded in other applications, such as a web browser or may be offered as a standalone device or application interface in a multi-purpose user device 110, such as a computer or a smart phone. The player may include software or hardware controls for playback, stop, pause, rewind, fast forward, etc.

Multicast access network 120 may provide customers with multimedia content provided, for example, by content provider 150. Multicast access network 120 may include a local area network (LAN), a wide area network (WAN), such as a cellular network, a satellite network, a fiber optic network, a private WAN, or a combination of the Internet and a private WAN, etc. that is used to transport data. In one implementation, multicast access network 120 may be utilized as a "last mile solution" to provide a connection between a customer and a service provider. Although shown as a single element in FIG. 1, multicast access network 120 may include a number of separate networks that function to provide services (e.g., video content delivery and other data) to user devices 110. For example, multicast access network 120 may include collection of access and distribution networks that exchange multicast information between them.

In one implementation, multicast access network 120 may terminate at a home network (e.g., including user device 110) via an optical communication link, such as an optical fiber provided to the home network. In another possible implementation, multicast access network 120 may terminate at a home network via a coaxial cable. In still another implementation, multicast access network 120 may terminate at user device 110 or a home network associated with user device 110 via a wireless (e.g., cellular, satellite, etc.) connection. As shown in FIG. 1, multicast access network 120 may include switched delivery system 122.

Switched delivery system 122 may include a traffic transfer device (or network device), such as a gateway, a router, a switch, a firewall, a network interface card (NIC), a hub, a bridge, a proxy server, an optical add-drop multiplexer (OADM), or some other type of device that processes and/or transfers traffic. In an example implementation, switched delivery system 122 may include a network of devices capable of receiving multiple IP television (IPTV) content streams (e.g., with different bit rates from the same content) from multicast ISP network 130, global CDN 140, and/or content provider 150. Switched delivery system 122 may provide a particular content stream (e.g., associated with a particular bit rate/quality) of the IPTV content to user devices 110. Switched delivery system 122 may provide unicast or multicast content. Multicast content may require scheduling by one or more scheduling servers (e.g., provided in multicast access network) to optimize delivery of content to a large number of user devices 110 (e.g., selecting and subscribing to popular content). In one implementation, portions of content dropped during multicast transmission (e.g., due to bit errors or packet loss) can be resent via unicast transmission. While shown in FIG. 1 within multicast access network 120, in other implementations, switched delivery system 122 may be included within another network (e.g., multicast ISP network 130) or distributed among multiple networks.

Multicast ISP network 130 may include one or more devices that may provide video content, instructions, and/or other information to user devices 110 and/or multicast access network 120. Multicast ISP network 130 may temporarily store and provide content that is the subject of a content request from user device 110. In one implementation, access to multicast ISP network 130 (e.g., by user devices 110) may be restricted by a service provider that operates multicast ISP network 130. For example, access to multicast ISP network 130 may be restricted to particular users with particular subscription packages and enforced by, for example, password protection (for a user), device identifiers (for user devices 110 and or associated home networks), and/or application identifiers (e.g., residing on user devices 110 and/or portable media). Multicast ISP network 130 may also include other devices (not shown), such as, a content server, a policy management server, streaming devices, and storage devices.

Global CDN 140 may include one or more server devices, or other types of computation or communication devices, that gather, process, search, and/or provide information in a manner described herein. In one implementation, global CDN 140 may include a computer system, applications, a cable head-end, and/or broadcasting devices capable of providing streaming video content (e.g., IPTV content, TV programming, movies, on-demand services, live television, etc.), commercials, advertisements, instructions, and/or other information to user devices 110 via, for example, multicast ISP network 130 and multicast access network 120.

Content provider 150 may include any type or form of content provider. For example, content provider 150 may include free television broadcasters (e.g., local broadcasters, such as NBC, CBS, ABC, and Fox), for-pay television broadcasters (e.g., ESPN, HBO, Cinemax, etc.), and/or web-based content providers (e.g., streaming content from web sites). Content from content provider 150 may include linear and/or non-linear content. In one implementation content provider 150 may generate multiple synchronized multicast streams of the same content, with each multicast stream having a different bit-rate encoding. In one implementation, content provider 150 may provide the multiple synchronized multicast streams to global CDN 140 for distribution to multicast ISP network 130 or, alternatively, directly to multicast ISP network 130. In another implementation, content provider 150 may supply a single multicast stream to global CDN 140 or multicast ISP network 130. In this implementation, global CDN 140 or multicast ISP network 130 may encode the video content stream at different bit rates to create multiple multicast streams and synchronize the multiple multicast streams to create the multiple synchronized multicast streams.

In still another implementation, content provider 150 may supply non-linear (or on-demand) content to user devices 110. For example, on-demand content may be multicast using both cyclic file encoding and different bit rate streams for each encoding cycle. Thus, user devices 110 may join an on-demand multicast stream at any common interval provided by the cyclic file encoding and may switch between synchronized multicast streams for a selected encoding cycle. Additionally, or alternatively, content provider 150 may employ other methods for providing on-demand concurrency. Content provider 150 and global CDN 140 may be referred to herein collectively and/or generically as a content source.

In implementations described herein, user device 110 may request streaming video content, such as live IPTV content or on-demand content, from content provider 150. Content provider 150 may send, to user device 110, information about a group of multicast streams (e.g., content group streams 160) for the particular streaming video content. The information may include a different bit-rate indication associated with each stream of content group streams 160 and a multicast IP address for each stream of content group streams 160. User device 110 may monitor congestion levels and/or current bandwidth capacity to request, via one of the multicast IP addresses, one of the synchronized multicast streams (e.g., the $Q_1$ stream). Switched delivery system 122 may assign user device 110 to the appropriate multicast group and may begin sending the $Q_1$ stream to user device 110. Later, user device 110 may detect congestion associated with receiving the $Q_1$ stream. User device 110 may request, via a different one of the multicast IP addresses, one of the synchronized multicast streams (e.g., the $Q_2$ stream). Switched delivery system 122 may assign user device 110 to the new multicast group (e.g., associated with $Q_2$), may disassociate user device 110 from the previous multicast group (e.g., associated with $Q_1$), and may begin sending the $Q_2$ stream to user device 110. Implementations described herein thus may present a scalable solution for providing adaptive bit-rates to user devices 110. The number of adaptive steams provided to multicast access network 120 (e.g., content group streams 160) may remain constant regardless of the number of user devices 110 requesting the content.

While FIG. 1 shows a particular number and arrangement of networks and/or devices, in practice, network 100 may include additional networks/devices, fewer networks/devices, different networks/devices, or differently arranged networks/devices than are shown in FIG. 1.

Figure 2:
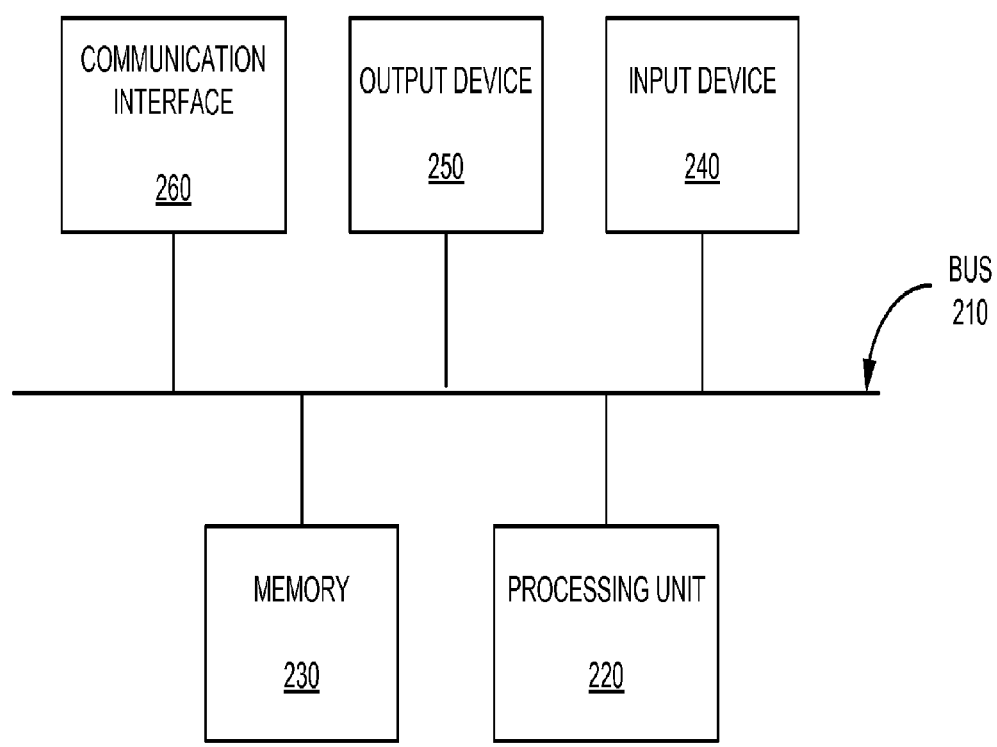
FIG. 2 is a diagram of example components of a device that may be used within the environment of FIG. 1.

FIG. 2 is a diagram of example components of a device 200 that may correspond to one of the devices of network 100. Each of user device 110, multicast access network 120, multicast ISP network 130, global CDN 140, and content provider 150 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device (e.g., a flash memory or a solid state disk drive) that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
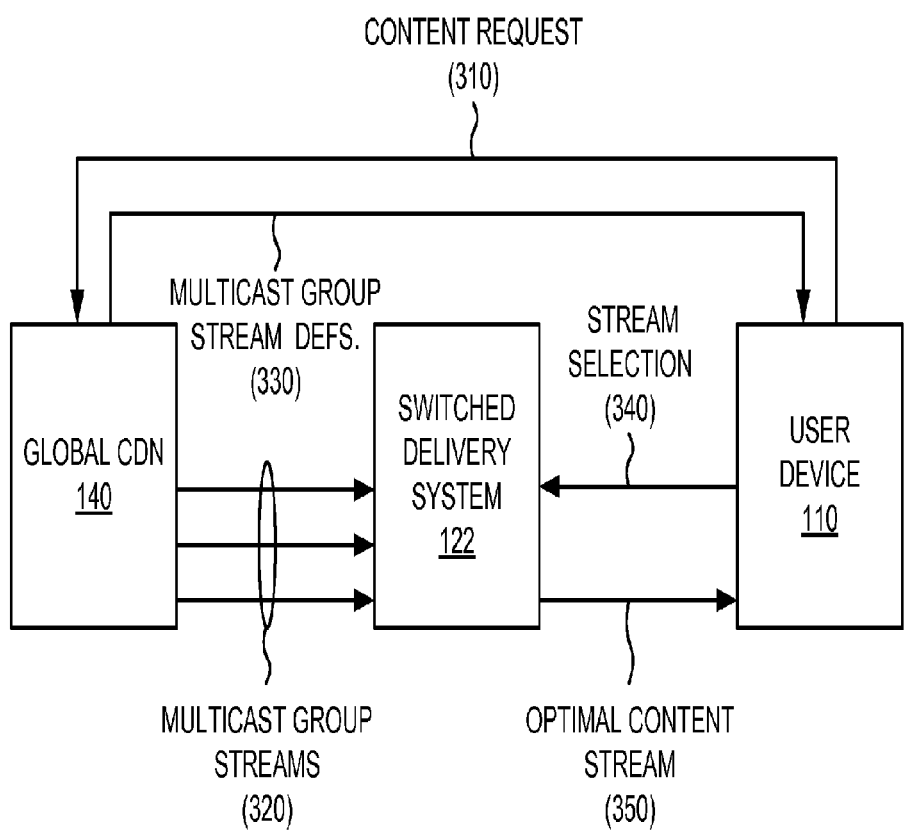
FIG. 3 is a diagram of example interactions between components of an example portion of the network depicted in FIG. 1.

FIG. 3 depicts a diagram of example interactions among components of an example portion 300 of network 100. As illustrated, example network portion 300 may include user device 110, switched delivery system 122, and global CDN 140. User device 110, switched delivery system 122, and global CDN 140 may include the features described above in connection with one or more of FIGS. 1 and 2.

As further shown in FIG. 3, a user (not shown) may utilize user device 110 to initiate a connection with global CDN 140 (e.g., via multicast access network 120 and multicast ISP network 130, not shown) and may provide a content request 310 to global CDN 140. Content request 310 may include, for example, a link (e.g., a universal resource locator (URL)) previously obtained from a web server associated with the requested content. For example, assuming a user has been previously authenticated, user device 110 may receive from the web server a catalog of video content from which particular content may be selected (e.g., live television, video on demand (VOD) content, high definition (HD) VOD content, HD3D VOD content, TV programming, movies, on-demand services, etc.). The user may select particular content from the catalog to view, and the indication of the particular content selection may be sent from user device 110 to global CDN 140 as content request 310.

Global CDN 140 may receive content request 310 and, in response, may provide multicast group streams 320 to switched delivery system 122 and multicast group stream definitions 330 to user device 110. Multicast group streams 320 may include, for example, synchronized multicast streams of the same video content, but with each multicast stream having a different bit rate. For example, multicast group streams 320 may include a first stream at a high bit rate for highest-quality (e.g., high-definition) video, a second stream at a medium bit rate for lower quality (e.g., less-bandwidth intensive) video, and a third stream at a lowest bit rate for lowest-quality (e.g., least-bandwidth intensive) video. In other implementations, more or fewer multicast streams may be included in multicast group streams 320. For example, in another implementation, multicast group streams 320 may include a content stream optimized for mobile content delivery. In another implementation, multicast group streams 320 may include more streams with smaller bit-rate intervals between each multicast stream (e.g., five streams gradually ranging from a highest to lowest quality).

Multicast group stream definitions 330 may include information to associate multicast group streams 320 with a single content item. In one implementation, multicast group stream definitions 330 may include information to make elements in network 100, such as user device 110 and switched delivery system 122, aware of the content and quality associated with each of the streams in multicast group streams 320. For example, multicast group stream definitions 330 may include a content identifier for the content group, a separate multicast IP address associated with each of streams in multicast group streams 320, and a bit-rate associated with each stream. As a particular illustration, a content identifier for the content group may be a title, and/or hash value for "Friday Night Football" at 8:00 PM EST. Each multicast stream of multicast group streams 320 may include a different multicast IP address associated with a different quality level of the "Friday Night Football" content. A different bit-rate may be identified for each of the different multicast IP addresses.

User device 110 may receive multicast group stream definitions 330 and may select an appropriate multicast IP address associated with a content stream from the content streams identified in multicast group stream definitions 330. In one implementation, user device 110 may detect current conditions, associated with user device 110, and determine which content stream of multicast group streams 320 is optimal for current conditions. For example, user device 110 may monitor buffer fill rates, processor capacity, network connection type, or other information to determine an optimal content stream of multicast group streams 320. For example, user device 110 may implement a back-off algorithm to manage bandwidth/quality trade-offs. User device 110 may provide a stream selection to switched delivery system 122, as indicated by reference number 340.

Switched delivery system 122 may receive stream selection 340 and may associate user device 110 with the multicast group for the selected stream (e.g., one of multicast group streams 320). Switched delivery system 122 may then provide an optimal content stream 350 (e.g., corresponding to content request 310 and stream selection 340) to user device 110. User device 110 may continue to monitor available bandwidth to upgrade/downgrade content quality so as to provide continuous streaming of the request video content. Based on this continued monitoring, user device 110 may initiate a switch among the available synchronized streams of multicast group streams 320 by providing additional stream selection(s) 340. In response to each stream selection 340, switched delivery system 122 may associate user device 110 with a new multicast group (e.g., one of multicast group streams 320) and provide optimal content stream(s) 350 responsive to each stream selection 340. Switched delivery system 122 may also disassociate user device 110 from the previous multicast group. In this manner, uninterrupted streaming of content may be provided to user device 110. No policy management is required by the network (e.g., multicast access network 120 and/or multicast ISP network 130), since back-off algorithms may be employed at each user device 110.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
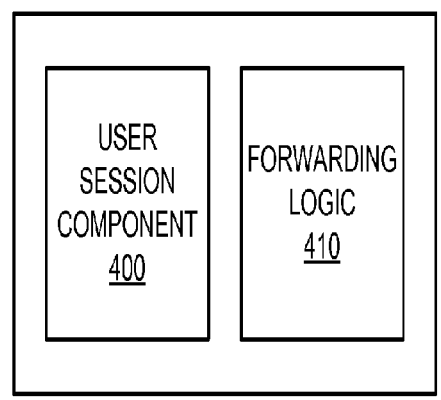
FIG. 4 is a diagram of example functional components of a switched delivery system of FIG. 1.

FIG. 4 is a diagram of example functional components of switched delivery system 122. In one implementation, the functions described in connection with FIG. 4 may be performed by one or more components of device 200 (FIG. 2). As shown in FIG. 4, switched delivery system 122 may include a user session component 400 and forwarding logic 410.

User session component 400 may include hardware or a combination of hardware and software that may manage multicast group associations for user devices 110. For example, user session component 400 may receive stream selections 340 and, based on a multicast IP address included in stream selection 340, may assign the user device to a particular multicast group. Additionally, based on receipt of stream selection 340, user session component 400 may disassociate user device 110 from a previous multicast group (e.g., associated with the same content).

Forwarding logic 410 may include hardware or a combination of hardware and software that may receive a particular one of the different types of content, and may provide multicast replication for the particular content. For example, forwarding logic 410 may replicate each stream of multicast group streams 320 to each user device 110 that is currently included in the multicast group for the particular stream.

Although FIG. 4 shows example functional components of switched delivery system 122, in other implementations, switched delivery system 122 may include fewer functional components, different functional components, differently arranged functional components, and/or additional functional components than depicted in FIG. 4. Alternatively, or additionally, one or more functional components of switched delivery system 122 may perform one or more other tasks described as being performed by one or more other functional components of switched delivery system 122.

Figure 5:
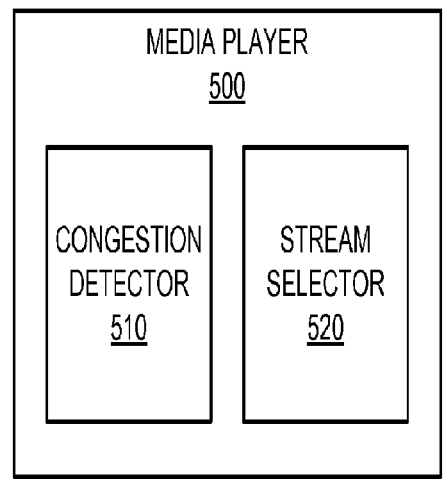
FIG. 5 is a diagram of example functional components of a user device of FIG. 1.

FIG. 5 is a diagram of example functional components of user device 110. In one implementation, the functions described in connection with FIG. 5 may be performed by one or more components of device 200 (FIG. 2). As shown in FIG. 5, user device 110 may include a media player 500, which may include a congestion detector 510 and a stream selector 520.

Media player 500 may include hardware or a combination of hardware and software that may receive streaming media and present the streaming media to a user of user device 110. For example, media player 500 may receive a video stream (e.g., optimal content stream 350), buffer the received video stream, and present the buffered video stream to the user. In one implementation, the video stream may be buffered in memory 230.

Congestion detector 510 may include hardware or a combination of hardware and software that may generate congestion feedback information for a received video stream (e.g., optimal content stream 350). Congestion feedback information may include, for example, a buffer fill rate. In one implementation, congestion detector 510 may include a counter, a high flow-control threshold and a low flow-control threshold. The high flow-control threshold and the low flow-control threshold may divide a buffer into three regions, namely a back-off (e.g., too full) region, a hysteresis region, and an upgrade (e.g., almost empty) region. In case of congestion, as the fill-level of the buffer exceeds the high flow-control threshold, congestion detector 510 may indicate that a downgrade in video stream quality is necessary (e.g., to maintain continuity). When the fill level of the buffer drops below the low flow-control threshold, congestion detector 510 may indicate that an upgrade in video stream quality is possible.

Stream selector 520 may include hardware or a combination of hardware and software that may identify an optimal stream, from multicast group streams 320, based on feedback from congestion detector 510 and multicast group stream definitions 330. For example, stream selector 520 may receive a downgrade indication from congestion detector 510 and may select a content stream with one or more quality levels lower than an existing stream. Conversely, stream selector 520 may receive an upgrade indication from congestion detector 510 and may select a content stream with one or more quality levels higher than an existing stream.

Although FIG. 5 shows example functional components of user device 110, in other implementations, user device 110 may include fewer functional components, different functional components, differently arranged functional components, and/or additional functional components than depicted in FIG. 5. Alternatively, or additionally, one or more functional components of user device 110 may perform one or more other tasks described as being performed by one or more other functional components of user device 110.

FIG. 6 is a flowchart of an example process 600 for providing different quality synchronized multicast streams to a user device, according to an implementation described herein. In one implementation, process 600 may be performed by switched delivery system 122. In another implementation, one or more blocks of process 600 may be performed by one or more components of other devices of network 100, including or excluding switched delivery system 122.

Process 600 may include receiving multiple synchronized streams of the same video content with differing bit-rates (block 610). For example, as described above in connection with FIG. 3, switched delivery system 122 may receive (e.g., from global CDN 140) multicast group streams 320. Multicast group streams 320 may include, for example, synchronized multicast streams of the same video content, but with each multicast stream having a different bit rate. For example, multicast group streams 320 may include a first stream at a high bit rate for highest-quality (e.g., high-definition) video, a second stream at a medium bit rate for lower quality (e.g., less-bandwidth intensive) video, and a third stream at a lowest bit rate for lowest-quality (e.g., least-bandwidth intensive) video.

Returning to FIG. 6, process 600 may include receiving, from a user device, request to join multicast group for one of the multiple synchronized streams (block 620) and associating the user device with the requested multicast group (block 630). For example, as described above in connection with FIG. 3, user device 110 may provide stream selection 340 to switched delivery system 122. Switched delivery system 122 may receive stream selection 340 and may associate user device 110 with the multicast group for the selected stream (e.g., one of multicast group streams 320).

Returning to FIG. 6, process 600 may include providing one of the multiple synchronized streams, via multicast, to a user device (block 640), and receiving from the user device, selection of a different one of the multiple synchronized streams (block 650). For example, as described above in connection with FIG. 3, switched delivery system 122 may receive stream selection 340 and may associate user device 110 with the multicast group for the selected stream (e.g., one of multicast group streams 320). Switched delivery system 122 may then provide optimal content stream 350 (e.g., corresponding to content request 310 and stream selection 340) to user device 110. User device 110 may continue to monitor available bandwidth to upgrade/downgrade content quality so as to provide continuous streaming of the request video content. Based on this continued monitoring, user device 110 may initiate a switch among the available synchronized streams of multicast group streams 320 by providing additional stream selection(s) 340.

Returning to FIG. 6, process 600 may include associating, based on the received selection, the user device with the requested different multicast group (block 660), and providing to the user device, via multicast, the different one of the multiple synchronized streams (block 670). For example, as described above in connection with FIG. 3, in response to each stream selection 340, switched delivery system 122 may associate user device 110 with a new multicast group (e.g., associated with one of multicast group streams 320), provide optimal content stream(s) 350 responsive to each stream selection 340, and disassociate user device 110 from the previously selected multicast group.

FIG. 7 is a flowchart of an example process 700 for performing multicast adaptive stream switching for delivery of over the top video content, according to an implementation described herein. In one implementation, process 700 may be performed by user device 110. In another implementation, one or more blocks of process 700 may be performed by one or more components of other devices of network 100, including or excluding user device 110.

Process 700 may include submitting a request for content to a content source (block 710), and receiving multicast group stream definitions, for the requested content, with a multicast IP address for each stream (block 720). For example, as described above in connection with FIG. 3, a user (not shown) may utilize user device 110 to initiate a connection with global CDN 140 (e.g., via multicast access network 120 and multicast ISP network 130) and generate content request 310. Content request 310 may include, for example, a link (e.g., a URL) previously obtained from a web server associated with the requested content. In response to content request 310, user device 110 may receive multicast group stream definitions 330. Multicast group stream definitions 330 may include information to associate multicast group streams 320 with a single content item. In one implementation, multicast group stream definitions 330 may include information to make elements in network 100, such as user device 110 and/or switched delivery system 122, aware of the content and quality associated with each of the streams in multicast group streams 320. For example, multicast group stream definitions 330 may include a content identifier for the content group, a separate multicast IP address associated with each of streams in multicast group streams 320, and a bit-rate associated with each stream.

Returning to FIG. 7, process 700 may include requesting, via one of the multicast IP addresses, one of the streams from the multicast group stream definitions (block 730), and receiving the requested multicast stream (block 740). For example, as described above in connection with FIG. 3, user device 110 may detect current conditions, associated with user device 110, and determine which content stream of multicast group streams 320 is optimal for current conditions. User device 110 may provide stream selection 340 to switched delivery system 122. User device 110 may receive optimal content stream 350, buffer the received video stream, and present the buffered video stream to the user.

Returning to FIG. 7, process 700 may include monitoring congestion associated with the requested multicast stream (block 750), and determining if congestion levels are outside one or more threshold(s) (block 760). For example, as described above in connection with FIG. 5, user device 110 (e.g., congestion detector 510) may generate congestion feedback information for a received video stream (e.g., optimal content stream 350). Congestion feedback information may include, for example, a buffer fill rate. In one implementation, congestion detector 510 may include a counter, a high flow-control threshold, and a low flow-control threshold. In case of congestion, as the fill-level of the buffer exceeds the high flow-control threshold, congestion detector 510 may indicate that a downgrade in video stream quality is necessary (e.g., to maintain continuity). When the fill level of the buffer drops below the low flow-control threshold, congestion detector 510 may indicate that an upgrade in video stream quality is possible.

If congestion levels are outside one or more threshold(S) (block 760—YES), process 700 may include requesting, via one of the multicast IP addresses, a different one of the streams from the multicast group stream definitions (block 770). For example, referring to FIG. 5, user device 110 (e.g., stream selector 520) may identify an optimal stream, from multicast group streams 320, based on feedback from congestion detector 510 and multicast group stream definitions 330. Stream selector 520 may receive a downgrade indication from congestion detector 510 and may select a content stream with one or more quality levels lower than an existing stream. Conversely, stream selector 520 may receive an upgrade indication from congestion detector 510 and may select a content stream with one or more quality levels higher than an existing stream.

Referring again to FIG. 7, if congestion levels are not outside one or more threshold(S) (block 760—NO), process 700 may return to block 750 to continue monitoring congestion associated with the requested multicast stream.

Systems and/or methods described herein may provide multicast adaptive stream switching for delivery of video content over an IP-based packet network. Adaptive bit-rate switching concepts may be combined with IP multicast to simultaneously stream multiple qualities (e.g., bit-rate encodings) of the same video content that can be "hot-switched" by a client application residing on a user device. Implementations described herein thus may present a scalable solution for providing adaptive bit-rates to user devices. The number of multicast adaptive steams provided over a core IP network may remain constant regardless of the number of user devices requesting the content.

Systems and/or methods described herein may resolve problems concerning support of OTT deliver during "primetime" hours with a large numbers of concurrent users. For example, IP multicast may not back-off (e.g., to a lower quality) during congested periods (e.g., during "primetime" hours) to preserve a constant stream to users. Thus, policy management by the network may be required to provide quality of experience for the user. As another example, adaptive bit-rate streaming may use a unicast stream encoded into HTTP packets or RTMP (real-time messaging protocol) data messages to deliver video content. Several versions of video streams may be encoded simultaneously, and client devices can request the appropriate quality for their available network bandwidth in to maintain a constant video stream. However, today's modern IP networks do not support this approach at large scale since the flood of simultaneous HTTP requests and video streams can overwhelm the available network resources. In contrast, systems and/or methods described herein may not require policy management, and network utilization may be optimized to provide OTT delivery concurrently to a large number of users.

Using the systems and/or methods described herein no interruption in the video content present may be experienced when the user device switches from one quality multicast stream to another. For example, if the user device is presenting a show in HD and bandwidth limits require the user device to switch to a lower quality video stream, the streams may be switched without interruption (e.g., the new lower quality stream may pick up from where HD part of the show left off).

The foregoing description provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:

receiving, by a network device, multiple synchronized multicast streams of the same video content, where each of the multiple synchronized multicast streams includes a different video quality;

receiving, by the network device and from a user device, a request for the video content;

providing, by the network device and to the user device, a response, to the request for the video content, that includes information about each of the multiple synchronized multicast streams, wherein the information includes a different bit-rate indication and a different multicast Internet protocol (IP) address for each stream of the multiple synchronized multicast streams;

receiving, by another network device and from the user device via a first one of the different multicast IP addresses, a request to join a first multicast group for one of the multiple synchronized multicast streams;

providing, by the other network device and to the user device, the one of the multiple synchronized multicast streams corresponding to the first multicast group;

monitoring, by the user device, congestion associated with the requested one of the multiple synchronized multicast streams;

sending, by the user device and via a second one of the different multicast IP addresses, a request to join a different one of the multiple synchronized multicast streams when the monitoring indicates a congestion threshold has been reached;

receiving, by the other network device and from the user device via the second one of the different multicast IP addresses, the request to the different one of the multiple synchronized multicast streams; and providing, by the other network device and to the user device, the different one of the multiple synchronized multicast streams corresponding to a second multicast group.

2. The method of claim 1, further comprising:
associating, by the other network device, the user device with the first multicast group;
associating, by the other network device and after receiving the request to join the second multicast group, the user device with the second multicast group; and
disassociating, by the other network device, the user device from the first multicast group.

3. The method of claim 1, further comprising:
forwarding, by the network device, the multiple synchronized multicast streams to the other network device, where the other network device is included within a multicast-enabled access network.

4. The method of claim 1, where the video content is provided to the other network device by one of a content provider device or a global content delivery network.

5. The method of claim 1, where each of the multiple synchronized multicast streams includes a different bit rate encoding of the same video content corresponding to the information about each of the multiple synchronized multicast streams.

6. The method of claim 1, further comprising:
receiving, from a content provider, a video content stream for the video content;
encoding the video content stream at different bit rates to create multiple multicast streams; and
synchronizing the multiple multicast streams to create the multiple synchronized multicast streams.

7. The method of claim 1, further comprising:
receiving, from another user device, a request to join a third multicast group for one of the multiple synchronized multicast streams, where the third multicast group is different from the first and second multicast groups; and
providing, to the other user device, the one of the multiple synchronized multicast streams corresponding to the third multicast group.

8. One or more devices, comprising:
a network device to:
obtain multiple synchronized multicast streams of the same video content, where each of the multiple synchronized multicast streams includes a different bit-rate encoding,
receive, from a user device, a request for the video content,
provide, to the user device, a response, to the request for the video content, that includes information about each of the multiple synchronized multicast streams, wherein the information includes a different bit-rate indication and a different multicast Internet protocol (IP) address for each stream of the multiple synchronized multicast streams,
receive, from the user device and via a first one of the multicast IP addresses, a request to join a first multicast group for a first one of the multiple synchronized multicast streams,
associate the user device with the requested first multicast group,
provide, to the user device and via a multicast-enabled access network, the first one of the multiple synchronized multicast streams corresponding to the requested multicast group,
receive, from the user device and via a second one of the multicast IP addresses, a request to join a second multicast group for a second one of the multiple synchronized multicast streams,
associate, by the network device, the user device with the requested second multicast group, and
provide, to the user device and via the multicast-enabled access network, the second one of the multiple synchronized multicast streams corresponding to the requested second multicast group;
wherein the user device is to:
receive the first one of the multiple synchronized multicast streams,
determine a congestion level associated with receiving the first one of the multiple synchronized multicast streams, and
send, based on the congestion level, the request to join the second multicast group.

9. The one or more devices of claim 8, where the network device is further to:
disassociate the user device from the requested first multicast group after associating the user device with the requested second multicast group.

10. The one or more devices of claim 8, where the one or more devices include a switched delivery device within the multicast-enabled access network.

11. The one or more devices of claim 8, where the multicast-enabled access network includes one of a wired or a wireless network.

12. The one or more devices of claim 8, where the video content is obtained from one of a content provider device or a global content delivery network.

13. The one or more devices of claim 8, where, when obtaining the multiple synchronized multicast streams, the network device is further to:
receive, from a content provider, a video content stream for the video content,
encode the video content stream at different bit rates to create multiple multicast streams; and
synchronize the multiple multicast streams to create the multiple synchronized multicast streams.

14. The one or more devices of claim 8, where, when obtaining the multiple synchronized multicast streams, the network device is to:
receive, from a content source, the multiple synchronized multicast streams.

15. A method, comprising:
sending, by a user device and to a content source, a request for particular video content;
receiving, by the user device and from the content source, a response, to the request, that includes information about a group of multicast streams for the particular video content, where the group of multicast streams includes synchronized multicast streams of different qualities, and where the information includes a different bit-rate indication and a different multicast Internet protocol (IP) address for each stream of the group of multicast streams;
requesting, by the user device and based on the information about the group of multicast streams, one of the synchronized multicast streams;
receiving, by the user device, the requested one of the synchronized multicast streams;
monitoring, by the user device, congestion associated with the requested one of the synchronized multicast streams; and
requesting, by the user device and via another one of the different multicast IP addresses, to join a different one of the synchronized multicast streams when the monitoring indicates a congestion threshold has been reached.

16. The method of claim 15, where monitoring congestion associated with the requested one of the synchronized multicast streams includes:

monitoring a buffer fill level associated with the requested one of the synchronized multicast streams.

17. The method of claim 15, where the monitoring congestion associated with the requested one of the synchronized multicast streams includes:

implementing a back-off algorithm to manage bandwidth/quality trade-offs.

18. A user device, comprising:

a memory to store a plurality of instructions; and
a processor to execute instructions in the memory to:
send, to a content source, a request for particular video content,
receive, from the content source, a response, to the request, that includes information about a group of multicast streams for the particular video content, where the group of multicast streams includes synchronized multicast streams of different qualities, and where the information includes a different bit-rate indication and a different multicast Internet protocol (IP) address for each stream of the group of multicast streams,
request, based on the information about the group of multicast streams, one of the synchronized multicast streams,
receive the requested one of the synchronized multicast streams,
determine a congestion level associated with receiving the requested one of the synchronized multicast streams, and
request, based on the congestion level and via another one of the different multicast IP addresses, to join a different one of the synchronized multicast streams.

19. The device of claim 18, where when determining the congestion level associated with receiving the requested one of the synchronized multicast streams, the processor is further to:

monitor a buffer fill level associated with the requested one of the synchronized multicast streams.

* * * * *